United States Patent [19]

Stuart et al.

[11] 4,123,710
[45] Oct. 31, 1978

[54] PARTIAL RESPONSE QAM MODEM

[75] Inventors: Richard L. Stuart, Simpsonville, Md.; Arvind M. Bhopale, Placentia, Calif.

[73] Assignee: Rixon, Inc., Silver Spring, Md.

[21] Appl. No.: 856,072

[22] Filed: Nov. 30, 1977

Related U.S. Application Data

[63] Continuation of Ser. No. 736,581, Oct. 28, 1976, abandoned.

[51] Int. Cl.² ............................................. H04L 3/00
[52] U.S. Cl. .................................. 325/38 A; 325/32; 325/44; 325/60
[58] Field of Search ................ 178/68; 325/32, 38 A, 325/40, 42, 43, 44, 49, 60, 164

[56] References Cited

U.S. PATENT DOCUMENTS

| | | | |
|---|---|---|---|
| 3,196,352 | 7/1965 | Hopner | 325/49 |
| 3,311,442 | 3/1967 | De Jager | 325/42 |
| 3,388,330 | 6/1968 | Kretzmer | 325/42 |
| 3,391,339 | 7/1968 | Lynch | 325/49 |
| 3,443,229 | 5/1969 | Becker | 325/60 |
| 3,456,193 | 7/1969 | Munoz | 325/60 |
| 3,492,578 | 1/1970 | Gerrish | 325/42 |
| 3,573,622 | 4/1971 | Holzman | 325/38 |
| 3,605,017 | 9/1971 | Chertok | 325/38 |
| 3,679,977 | 7/1972 | Howson | 325/42 |
| 3,723,880 | 3/1974 | VanGerwen | 325/38 A |
| 3,798,544 | 3/1974 | Norman | 325/38 A |
| 3,829,779 | 8/1974 | Fujimoto | 325/38 A |
| 3,947,767 | 3/1976 | Koike et al. | 178/68 |
| 3,955,141 | 5/1976 | Lyon et al. | 325/60 |
| 4,055,727 | 10/1977 | Katoh | 178/68 |

OTHER PUBLICATIONS

Davey, J. R., *Modems*, Proceedings of the IEEE, vol. 60, No. 11, Nov. 1972.

*Primary Examiner*—Benedict V. Safourek
*Attorney, Agent, or Firm*—William R. Sherman; Edward Manzo; Ross Hunt

[57] ABSTRACT

A partial response QAM Modem is provided wherein a transmit signal is generated by modulating band limited, multilevel, partial response precoded data with inphase and quadrature carriers in inphase and quadrature phase channels, respectively, and summing the modulated outputs. The received signal is processed by a passband automatic complex equalizer. The equalized signal is delayed and then demodulated with recovered inphase and quadrature carriers to recover the inphase and quadrature phase baseband signals. The recovered baseband signals are sampled at appropriate instants to produce estimates of the transmitted symbols. These symbols are partial response decoded and processed by error correctors to improve the overall system performance. The error corrector outputs are decoded to convert the multilevel estimated data to binary data and the binary data of the two channels is summed to obtain estimates of the binary data transmitted.

6 Claims, 12 Drawing Figures

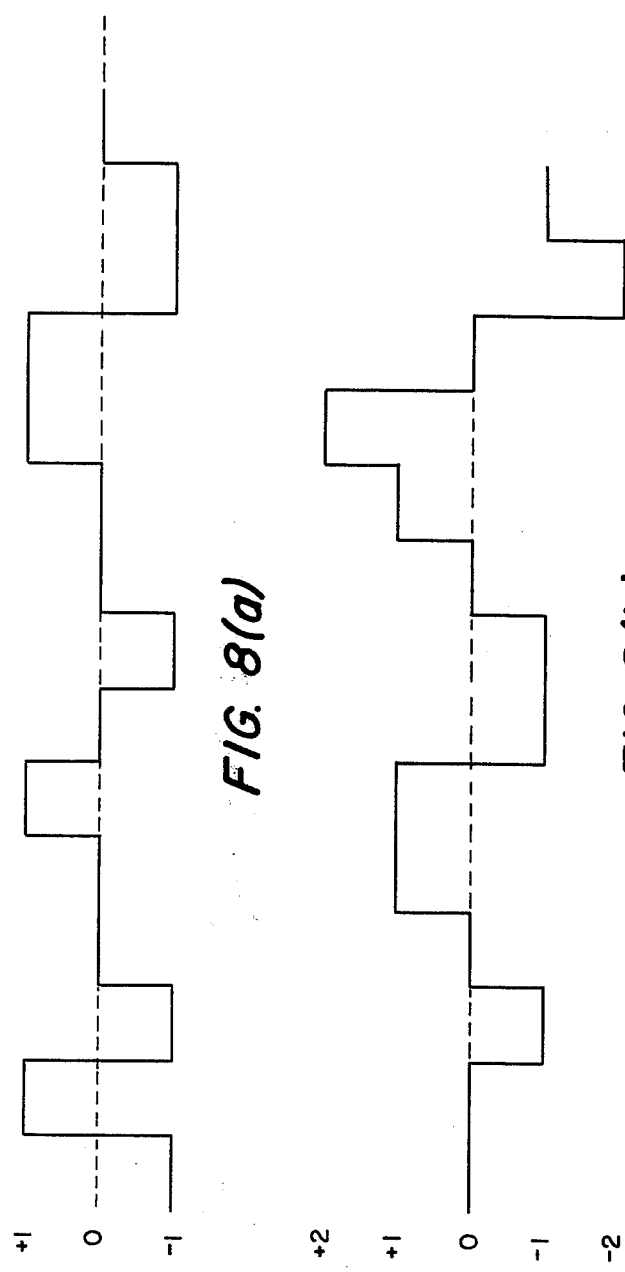
FIG. 8(a)
FIG. 8(b)
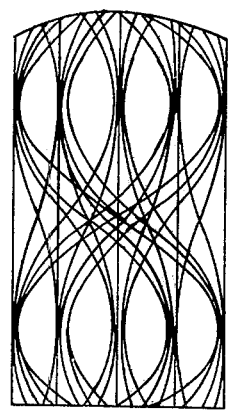
FIG. 9

PARTIAL RESPONSE QAM MODEM

This is a continuation of application Ser. No. 736,581, filed Oct. 28, 1976, now abandoned.

FIELD OF THE INVENTION

The present invention relates to communication systems utilizing quadrature amplitude modulation schemes and, more particularly, to an improved system using quadrature amplitude modulation in combination with partial response techniques.

BACKGROUND OF THE INVENTION

As is set forth hereinbelow, the present invention combines quadrature amplitude modulation techniques with partial response coding techniques resulting in modems which provide unusually high quality digital transmission at specific data rates. Before considering the invention itself, quadrature amplitude modulation and partial response coding techniques will be briefly considered by way of background.

Quadrature Amplitude Modulation (QAM) techniques have been used by data communication engineers for some time. In accordance with this general technique, the data to be transmitted is split into inphase (I) and quadrature phase (Q) channels. After suitable shaping (band-limiting), the signal in each channel is modulated with inphase and quadrature carriers, respectively. The modulated signals in the two channels are then summed to produce a band-limited QAM signal. In general, the error rate performance of a data communication using QAM techniques is less susceptible to small amounts of phase jitter in the demodulating carrier than systems using vestigial sideband (VSB) or single sideband (SSB) modulation techniques. In a high performance VSB or SSB system, a portion of the carrier and pilot tone is transmitted with the information bearing portion of the signal in order to permit recovery of the carrier. In a QAM system, all of the transmitted power is allotted to the information bearing portion of the signal, and the carrier can be recovered from the quadrature amplitude modulated signal itself (see Stiffler, "Theory of Synchronous Communications", Prentice Hall, 1971). Reference is also made to, e.g., Lucky, Salz and Weldon, "Principles of Data Communication", McGraw-Hill, 1968, for a further description of QAM systems.

Partial response techniques, wherein a controlled amount of intersymbol interference is employed in order to increase the transmission rate, are a more recent development and have been used with an AM-SSB scheme to achieve certain spectral shaping effects in data transmission. Reference is made to, e.g., Kretzmer, "Generalization of a Technique for Binary Data Communication" IEEE Transactions on Communication Technology, February 1966, for a description of various classes of partial response schemes and precoding techniques, such precoding being used to avoid error propagation in the decoded data. Reference is also made to U.S. Pat. No. 3,388,330 (Kretzmer). For a binary input signal, the partial response baseband signal includes at least three levels. A partial response system requires a higher signal-to-noise ratio than an ideal binary system for the same error rate. However, since the number of levels in a partial response system is always higher than the number of input levels, certain sequences of the estimated data can be eliminated as being impossible and thus a system using a three-level (ternary) partial response baseband signal can perform substantially as well as an ideal binary system. Reference is made to U.S. Pat. Nos. 3,492,578 (Gerrish et al) and 3,679,977 (Howson) for descriptions of multilevel precoded partial response data transmission systems.

SUMMARY OF THE INVENTION

According to the invention, a data communication system is provided which combines QAM and partial response techniques. The system of the invention is specifically adapted to provide satisfactory quality digital transmission through a telephone voice channel at specific data rates. In particular, an optimum combination of multilevel encoding and QAM and partial response techniques is employed to provide the high quality performance referred to, at bit rates of 8,000 bits per second (BPS) and 16,000 BPS.

A number of factors must be considered in attempting to transmit an 8000 BPS or 16000 BPS signal through a telephone voice channel. The telephone channel has a bandwidth of approximately 300 to 3000 Hz (2700 Hz bandwidth), has various envelope delay characteristics and is perturbed by noise, phase jitter and frequency translation. In accordance with the present invention, for an 8000 BPS signal, the incoming data is converted into a 5×5 partial response coded QAM signal having a total bandwidth (at the natural zero of the spectrum) of ± 1,333.3 Hz, (2,666.6 Hz) which fits the 2700 Hz bandwidth of the channel. For a 16000 BPs signal, an 11×11 partial response QAM system is provided which has a total bandwidth of ± 1,600.00 Hz (3,200 Hz). While this total bandwidth somewhat exceeds the channel bandwidth, there are no signal components at ± 1,600 Hz and the components at ± 1,400 Hz and ± 1,500 Hz are so low in level that loss thereof is allowable.

In accordance with a preferred embodiment of the invention, the incoming serial binary data is split into inphase and quadrature phase channels, after being scrambled with a pseudo-random sequence. The binary data in each channel is converted to a multilevel signal thereby increasing the data rate per unit bandwidth. For example, for the 8000 BPS system referred to above, the binary data is converted to three levels while for the 16000 BPS system, sets of 5 bits are converted into pairs of six-level signals. The multilevel encoded data is partial response precoded and, using a shaping filter, converted to band-limited analog waveforms in each channel. The outputs of the shaping filters are multiplied (modulated) by inphase and quadrature phase carriers and the resultant outputs are summed to produce a band-limited partial response QAM signal.

At the receiver, the received partial response QAM signal is processed by a passband automatic complex equalizer to compensate for the amplitude and delay characteristics of the line. The inphase and quadrature phase carriers are recovered and applied to first and second demodulators along with delayed outputs from the equalizer to recover the inphase and quadrature phase baseband signals. These latter signals are sampled at appropriate instants to generate estimated symbols as well as error signals which are fed back to the passband automatic complex equalizer to provide appropriate adjustment of the tap voltages (coefficients). The estimated symbols in each channel are partial response decoded and corrected to generate multilevel estimated data. Multilevel decoders (e.g., the three-level to two-level decoders) convert the multilevel data into a sequence of estimated binary data. The sequences from each channel are combined and pseudo-random descrambling is used to recover the original transmitted signal.

Other features and advantages of the invention will be set forth in, or apparent from, the detailed description of a preferred embodiment found hereinbelow.

BRIEF DESCRIPTION OF THE DRAWINGS

FIGS. 8a and 8b are diagrams providing an example of three-level to five-level class I partial response encoding; and FIG. 9 is a diagram of the filtered waveform of the five-level eye pattern of a class I partial response system at the output of the low pass filters of FIG. 1.

DESCRIPTION OF THE PREFERRED EMBODIMENTS

Figure 1:
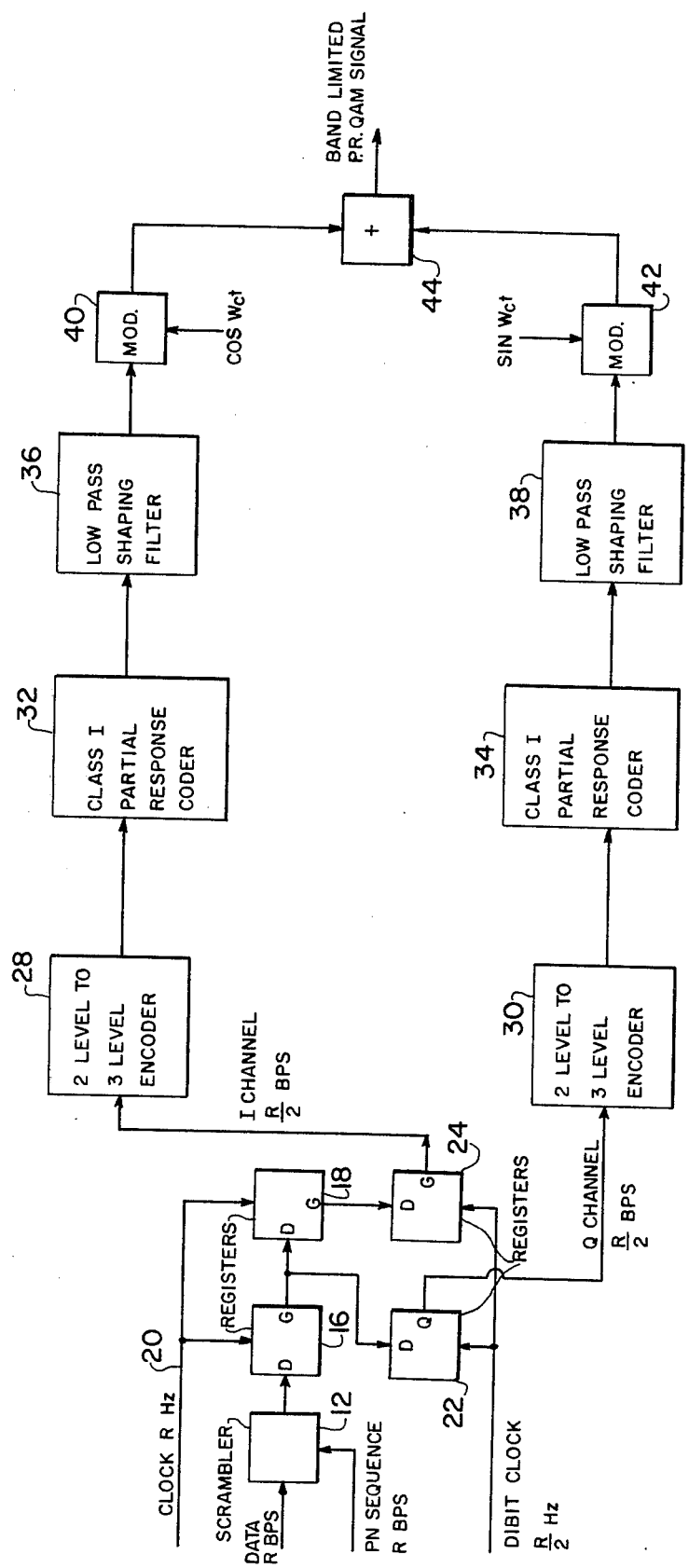
FIG. 1 is a block circuit diagram of a partial response QAM transmitter in accordance with a preferred embodiment of the invention.

Referring to FIG. 1, a block diagram of the transmitter of the partial response QAM system of the invention is shown. Serial binary data at a rate R bits per second (BPS) is applied to scrambler 12. The scrambling is achieved with a pseudo-random sequence with a long pattern. The scrambler 12 thus converts the serial binary data into a totally random distate data. This random data is fed serially into a pair of shift registers 16 and 18. Shift registers 16 and 18 are clocked at a rate of R Hz per second, as controlled from a clock input line 20. Thus, the random data is shifted R times per second. The output of registers 16 and 18 are connected to the inputs of a pair of registers 22 and 24, respectively. Registers 22 and 24 are clocked at a frequency of R/2 Hz per second, obtained by dividing the output of clock line 20 by two. The outputs of registers 22 and 24 are therefore parallel pairs of data bits conventionally termed "dibits". Hence, by the arrangement described, serial data bits are converted to parallel dibits, and two channels of dibit streams are obtained at the outputs of registers 22 and 24. These outputs form the inputs to the inphase (I) channel and quadrature (Q) channel. The outputs of registers 22 and 24 are connected to first and second two-level to three-level encoders 30 and 28, respectively.

Figure 5:
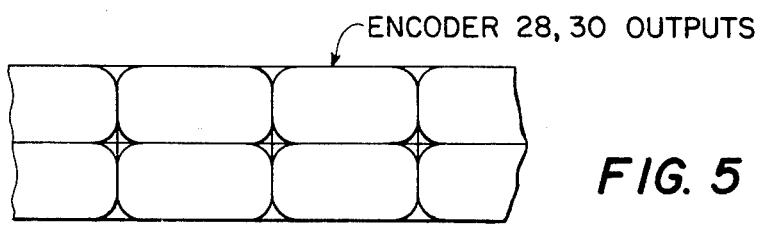
FIG. 5 is a representative diagram of the waveform at the output of the two-level to three-level encoders of FIG. 1.

Encoders 28 and 30 serve to code the two streams of random dibits into two streams of three-level tribits. Details of a suitable two-level to three-level encoder are described in U.S. Pat. No. 3,883,727 (Stuart et al). The outputs of the encoders 28 and 30 are three-level semi-square eye patterns, as shown in FIG. 5. These outputs are connected to first and second partial response coders 32 and 34.

Figure 6:
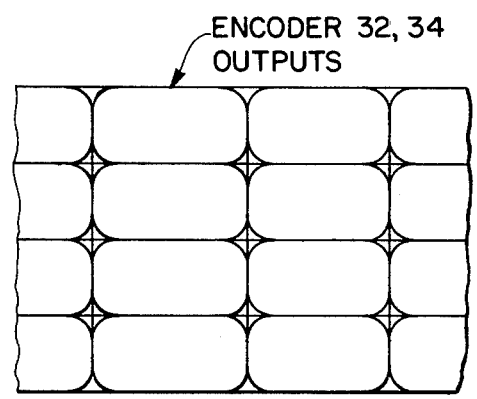
FIG. 6 is a diagram of the waveform at the output of the partial response coders of FIG. 1.

The coders 32 and 34 are class I partial response type coders. Such coders provide both precoding and encoding. Parital response coding or signaling, which is also referred to as correlative level coding and duobinary coding, imposes certain restraints on the three-level tribits in changing from one level to another. In accomplishing this, the regenerated streams of tribits data are encoded into five level streams of tribits as shown in FIG. 6. This results is retaining the same tribit capacity per channel while at the same time compressing the baseband frequency spectrum to one half of that prior to partial response coding. In class I partial response coding the transition from one extreme level to another extreme level in two successive tribits or keying intervals is prohibited, the keying interval being defined as the shortest real time interval between two successive level changes. Therefore, the Nyquist frequency in the frequency spectrum at the output of the two coders 32, 34 is one half of that prior to partial response coding. Consequently, the first natural null of the baseband spectrum in displaced by the same proportion, i.e., to the Nyquist frequency of the input frequency spectrum prior to partial response coding.

In class I partial response coding, the output will, in general, have 2L-1 levels, where L is the number of levels of the signal at the input of the coder. Before considering generalized L level partial response coding, two-level to three-level partial response coding will be described to aid in explaining, in real time, the process of two-to-one bandwidth compression. Thus, referring to the two-level binary random pattern shown in FIG. 7(a), this sequence of two-level bits is to be transformed to a new sequence of three-level partial response class I signalling. This process is implemented by time delaying the sequence by one bit interval, i.e., 1/R seconds where R is the bit rate in bits per seconds, and algebraically adding the delayed output to the input as shown in Table 1 below.

TABLE 1

| $a_i$ | $a_{i-1}$ | $a_i + a_{i-1}$ |
|---|---|---|
| +½ | −½ | 0 |
| −½ | +½ | 0 |
| +½ | −½ | 0 |
| +½ | +½ | +1 |
| −½ | +½ | 0 |
| −½ | −½ | −1 |
| +½ | −½ | 0 |
| −½ | +½ | 0 |
| −½ | −½ | −1 |
| −½ | −½ | −1 |
| — | −½ | —; |

Figure 7A:
FIG. 7a, 7b, and 7c are diagrams providing an example of two-level to three-level class I partial response encoding.
Figure 7B:
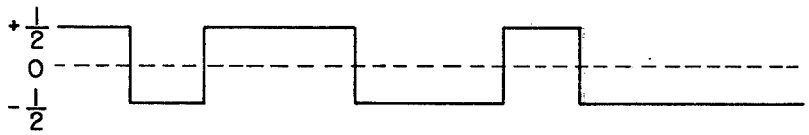
Figure 7C:
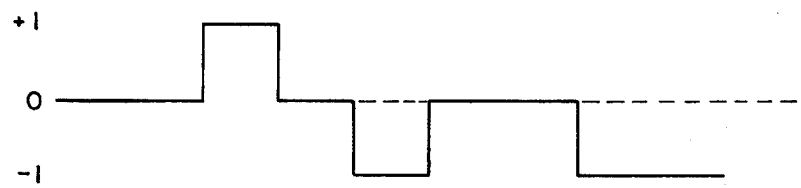

In Table 1, the first column represents the pattern shown in FIG. 7(a), but referenced so as to be bipolar. The second column represents the same pattern as the first column but delayed by one bit. The third column represents the algebraic sum of the first and second columns. The time function corresponding to the third column is shown in FIG. 7(c). As illustrated in FIG. 7(c), there is no transition between one extreme level to another extreme level.

Turning now to the precoding process, an error in the partial response encoded signal at the receiver, once made, will tend to propagate throughout the rest of the data bits. This is due to the fact that if the bit $a_{i\text{-}1}$ is in error then the bit $a_1$ is also likely to be in error. To avoid this, some kind of compensation at the receiver or some technique of precoding at the transmitter is necessary.

TABLE 6

| $b_i$ | $b_{i-1}$ | $a_i = b_i \oplus_3 b_{i-1}$ |
|---|---|---|
| 0 | 0 | $0 + 0 = 0 = 0$ |
| 0 | 0 | $0 + 0 = 0 = 0$ |
| 1 | 0 | $1 + 0 = 1 = 1$ |
| 1 | 1 | $1 + 1 = 2 = 2$ |
| 2 | 1 | $2 + 1 = 3 = 0$ |
| 2 | 2 | $2 + 2 = 4 = 1$ |
| 2 | 2 | $2 + 2 = 4 = 1$ |
| 0 | 2 | $0 + 2 = 2 = 2$ |
| 0 | 0 | $0 + 0 = 0 = 0$ |
| 2 | 0 | $2 + 0 = 2 = 2$ |
| 1 | 2 | $1 + 2 = 3 = 0$ |
| 0 | 1 | $0 + 1 = 1 = 1$ |
| 0 | 0 | $0 + 0 = 0 = 0$ |
| 1 | 0 | $1 + 0 = 1 = 1$ |
| 1 | 1 | $1 + 1 = 2 = 2$ |
| 0 | 1 | $0 + 1 = 1 = 1$ |
| 2 | 0 | $2 + 0 = 2 = 2$ |
|   | 2 |   |

The outputs of circuits 74 and 76 are connected to first and second 3-level to 2-level decoders 78 and 80, respectively. The corrected outputs of circuits 74 and 76 constitute the three-level estimated data and this data is read in pairs of tribits and converted into three serial bits in each channel using decoders 78 and 80. The outputs of decoders 78 and 80 are combined and converted into serial estimates of the transmitted data, by a parallel-to-serial converter 90.

The output of converter 90 is descrambled using a descrambler 92 which receives, as the other input thereto, the descrambling PN sequence, thereby providing recovery of the originally transmitter serial binary data.

Figure 3:
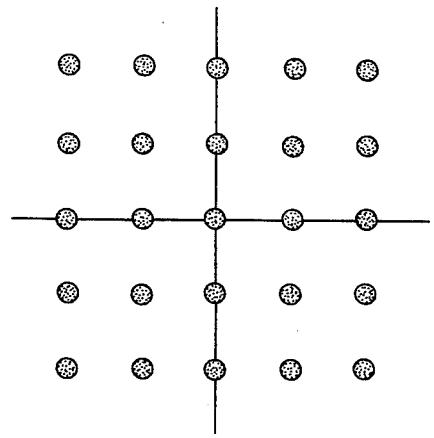
FIG. 3 is a signal space diagram for a 5×5 partial response QAM system.

The system described hereinabove is particularly adapted for use in transmitting an 8000 BPS through a telephone voice channel. The 8000 BPS signal is divided by two-thirds in the two-level to three-level encoding and the data stream is split using the QAM techniques to provide a partial response encoded signal having a bit rate of 2666.6 BPS and a Nyquist Frequency of 1333.3 Hz so that, as stated hereinbefore, the total bandwidth at the natural zeros of the spectrum is ± 1,333.3 Hz or 2,666.6 Hz. The space signal diagram, showing a plurality of points each representing the resultant vector sum of first and second modulated waves in quadrature, for the five by five (5×5) partial response QAM signal is shown in FIG. 3. The 25-state system makes efficient use of transmitted power and the signal power requirements are only slightly inferior to prior art 16-state systems.

Figure 2:
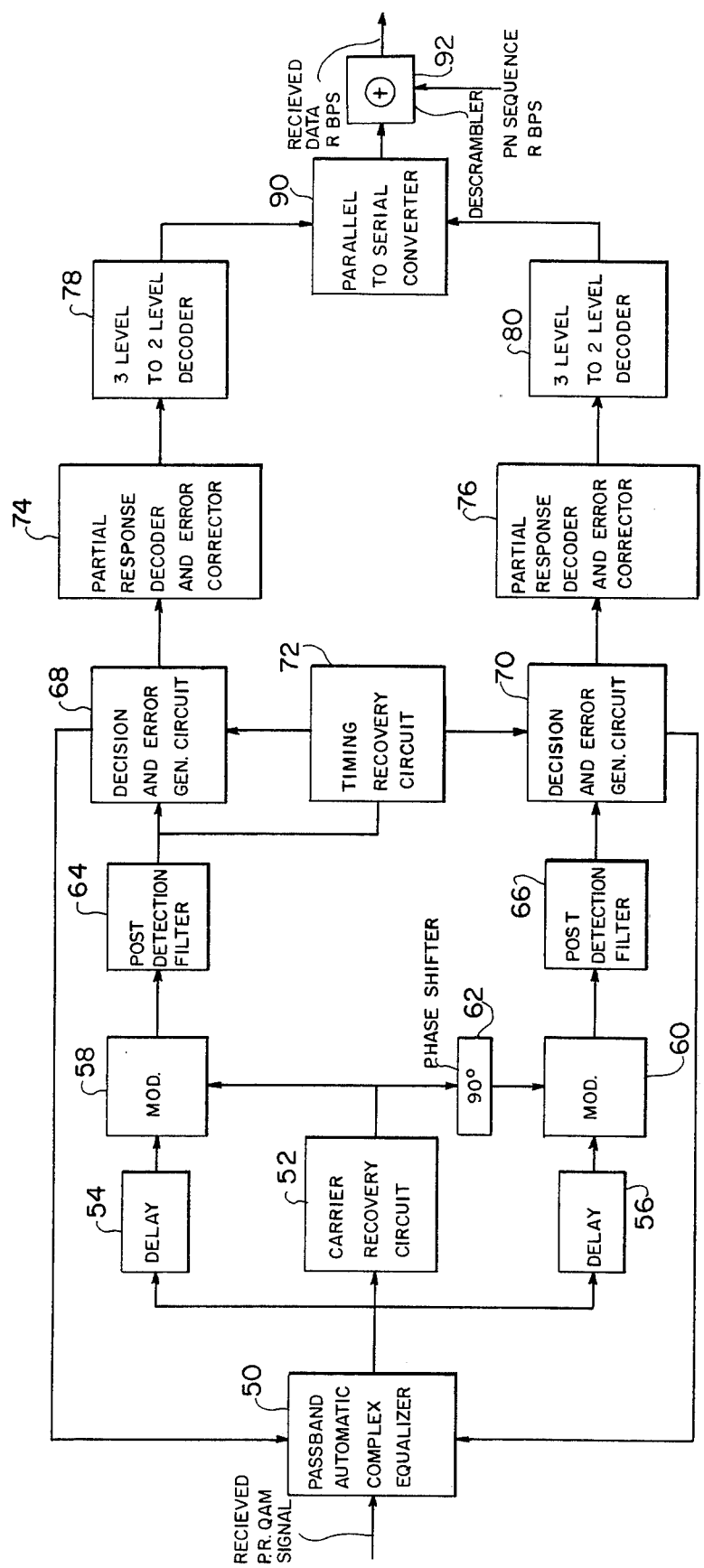
FIG. 2 is a block circuit diagram of a partial response QAM receiver in accordance with a preferred embodiment of the invention.
Figure 4:
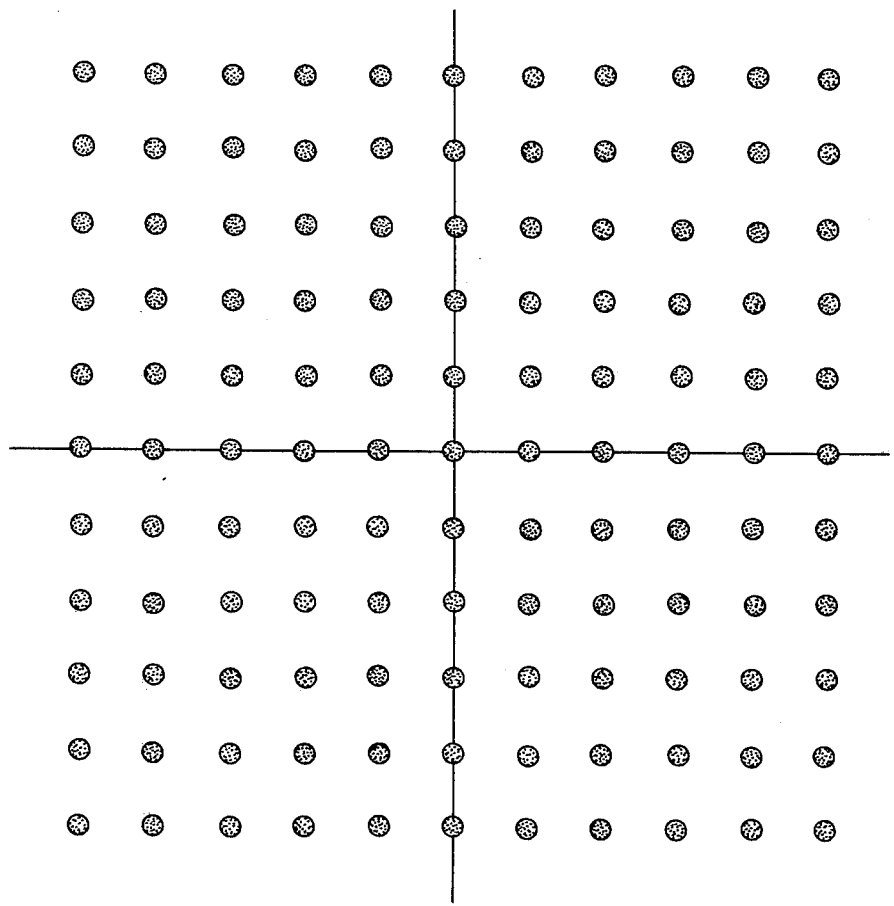
FIG. 4 is a signal space diagram for an 11×11 partial response QAM system.

As also was discussed, where it is desired to transmit 16000 BPS through a telephone voice channel, the binary signals are converted, in groups of five serial bits, to six-state characters and alternate six-level states are partial response encoded to provide two 11-level signals. The 11-level signals are applied to respective modulators which receive inphase and quadrature carriers and whose outputs are summed to produce a QAM signal in the manner described hereinabove. Demodulation of the received signal is also accomplished in a manner similar to that already described in connection with FIG. 2. The partial response precoding provides for multiplication of the Nyquist frequency by two-fifth and the two channel splitting provided by QAM modulation results in two signals having a baud rate of 3200 BPS and a Nyquist frequency of 1600 Hz. Thus, as stated, the total bandwidth at the natural zeros of the spectrum is ± 1600 Hz (or 3200 Hz). As explained previously, while this bandwidth is somewhat in excess of the channel bandwidth there are no signal components at ± 1600 Hz and those at ± 1500 Hz and 1400 Hz are of such a low level that loss thereof is without consequence. The signal space diagram for the 11×11 partial response QAM system is, as noted, shown in FIG. 4. More generally, this technique, i.e., encoding sets of five bits into pairs of six-level signals and coding these signals using Class I partial response techniques, can be used to reduce the bandwidth requirements for data transmission at a given rate of the preferred response QAM system.

Although the invention has been described relative to examplary embodiments thereof, it will be understood that other variations and modifications can be effected in these embodiments without departing from the scope and spirit of the invention.

We claim:

1. A partial response QAM data transmission system comprising:

transmitter means having means located in an inphase channel and a quadrature phase channel for receiving data input and for encoding sets of five bits into pairs of six-level signals;

partial response precoder means located in said inphase channel and said quadrature phase channel for partial response coding said six-level signals;

shaping filters located in said inphase channel and said quadrature phase channel for filtering the outputs of said partial response precoder means;

a first modulator located in said inphase channel for modulating the output of the shaping filter located in said inphase channel with an inphase carrier;

a second modulator located in said quadrature phase channel for modulating the output of the shaping filter located in said quadrature phase channel with a quadrature phase carrier;

summing means for summing the outputs of said first and second filters to produce a partial response coded QAM signal;

receiver means, for receiving the partial response coded QAM signal transmitted by said transmitter means, having automatic equalizer means for receiving said transmitted signal and producing a phase equalized received signal in response thereto;

carrier recovery means for recovering the transmitted carrier and for generating a recovered inphase carrier and a recovered quadrature phase carrier;

first and second demodulator means for demodulating the received signal with said recovered inphase carrier and said recovered quadrature carrier so as to produce first and second recovered baseband signals;

first and second partial response decoding circuits for partial response decoding said first and second recovered baseband signals; and six-level decoding means for converting said decoded recovered baseband signals into a recovered date input.

2. A system as claimed in claim 1 wherein said receiver means further comprises:

timing recovery means for recovering the clock frequency of the transmitted signal, and first and second decision and error generating means controlled by the recovered clock frequency and connected between said partial response decoding circuits and said first and second demodulator means.

3. A system as claimed in claim 1 wherein multilevel decoding means includes a parallel-to-serial converter circuit.

4. A partial response QAM transmitter for generating a 5×5 partial response QAM transmit signal for a telephone voice channel, said transmitter comprising:
   first and second binary-to-ternary converter means for receiving a binary data input sequence having a data rate of 8000 BPS and for converting said sequence into a three-level sequence;
   first and second Class I partial response coder means respectively connected to the outputs of said first and second binary-to-ternary converter means for precoding and encoding said three-level sequence as a five-level Class I partial response coded signal;
   first and second lowpass shaping filters connected to the outputs of said first and second partial response coder means for converting said partial response coded signals into filtered signals having a bandlimited analog waveform;
   first modulator means for modulating the output of said first filter with an inphase carrier;
   second modulator means for modulating the output of said second filter with a quadrature phase carrier; and
   means for summing the outputs of said first and second modulator means to produce a QAM transmit signal having a bandwidth of approximately 2,667 Hz.

5. A partial response QAM transmitter for generating an 11×11 partial response QAM transmit signal for a telephone voice channel, said transmitter comprising:
   means for generating an input data sequence at a data rate of 16000 BPS;
   means for encoding sets of five bits and said input data sequence into pairs of six-level signals;
   first and second Class I partial response coder means for precoding and encoding said six-level signals as class I partial response coded signals;
   first and second shaping filters connected to the outputs of said first and second partial response coder means for converting said partial response coded signals into filtered signals having a bandlimited analog waveform;
   first modulator means for modulating the output of said first shaping filter with an inphase carrier;
   second modulator means for modulating the output of said second shaping filter with a quadrature phase carrier;
   and means for summing the outputs of said first and second modulator means to produce an 11×11 QAM transmit signal having a total bandwidth of approximately 3200 Hz.

6. A partial response QAM data transmission transmitter comprising:
   scrambler means for receiving serial binary data and converting said data into random distate data using a pseudo-random sequence;
   means for converting said random data to parallel streams of dibits;
   first and second level converter means located in an inphase channel and quadrature phase channel, respectively, for converting said parallel streams of dibits into N-level signals, where $N \geq 3$;
   first and second partial response coder means located in respective ones of said channels, for partial response coding said multilevel signals to produce partial response coded signals;
   first and second modulator means, located in respective ones of said channels, for modulating the partial response coded signals with inphase and quadrature carriers, respectively, to produce modulated inphase and quadrature partial response coded signals; and
   summing means for summing the modulated inphase and quadrature partial response coded signals.

* * * * *